United States Patent [19]

Kilner et al.

[11] Patent Number: 5,143,534
[45] Date of Patent: Sep. 1, 1992

[54] HEAT PROCESSING OF PARTICULATE MATERIAL WITH A QUENCHING GAS WHICH SWIRLS AROUND THE PROCESSING ZONE

[75] Inventors: David N. Kilner, Horsham; Keith D. Humphrey, Hove; Lionel M. Little, East Grinstead; Duncan R. Carr; Lewis G. Sharp, both of Horsham, all of England

[73] Assignee: Shell Research Limited, London, United Kingdom

[21] Appl. No.: 531,248

[22] Filed: May 31, 1990

[30] Foreign Application Priority Data

Jun. 26, 1989 [GB] United Kingdom ........... 8914639

[51] Int. Cl.⁵ .................................... C03B 19/10
[52] U.S. Cl. ........................... 65/21.3; 65/142; 75/342; 75/953; 264/15; 425/7
[58] Field of Search ................ 65/21.3, 142, 141; 75/342, 953; 264/15; 266/216, 202, 218; 425/6, 7, 222, 446, 445, 383, 332, 334

[56] References Cited

U.S. PATENT DOCUMENTS

| 1,175,224 | 3/1916 | Bleeker | 65/21.3 |
| 2,334,578 | 11/1943 | Potters | 65/21.3 |
| 2,619,776 | 12/1952 | Potters | 65/21.3 |
| 2,838,381 | 6/1958 | Plumat | 65/142 |
| 2,947,115 | 12/1960 | Wood . | |
| 3,133,805 | 5/1964 | Robinson . | |
| 3,138,444 | 6/1964 | Searight et al. . | |
| 3,151,965 | 10/1964 | Patterson . | |
| 3,190,737 | 6/1965 | Schmidt . | |
| 4,475,936 | 10/1984 | Aston | 65/142 |

FOREIGN PATENT DOCUMENTS

| 0046376 | 2/1982 | European Pat. Off. . |
| 234061 | 3/1986 | German Democratic Rep. . |
| 740145 | 11/1955 | United Kingdom . |
| 875292 | 8/1961 | United Kingdom . |
| 984655 | 3/1965 | United Kingdom . |
| 1513531 | 6/1978 | United Kingdom . |
| 2121782 | 1/1984 | United Kingdom . |
| 2176774 | 1/1987 | United Kingdom . |

Primary Examiner—W. Gary Jones
Assistant Examiner—John M. Hoffmann
Attorney, Agent, or Firm—Jones, Tullar & Cooper

[57] ABSTRACT

The invention relates to a method of heat processing particles of glass. A first current of a mixture of a combustible gas and a gas capable of oxidizing the combustible gas is introduced into a substantially cylindrical chamber from its lower end. The combustible gas is ignited to form a flame in which the gases have a speed of less than 10 m/s. The resulting flame creates a heat processing zone in the chamber. A quenching zone is provided by a second current of gas introduced into the chamber adjacent the chamber side wall such that it swirls around the flame. Particles of glass are then introduced at the lower end of the chamber and these particles contact the flame in the heat processing zone and are then directed to the quenching zone where they are hardened and from which they are collected.

10 Claims, 4 Drawing Sheets

HEAT PROCESSING OF PARTICULATE MATERIAL WITH A QUENCHING GAS WHICH SWIRLS AROUND THE PROCESSING ZONE

The present invention relates to a process for the heat treatment of particulate materials, in particular to a process for the production of glass beads, and to apparatus suitable for carrying out the process.

Glass beads are useful in a number of applications, in particular, they find extensive use in the production of reflective materials such as traffic lane marking paints or reflective road signs. In addition, glass beads, especially those of small diameter, are used in coatings for cinema screens and for shot blasting purposes. It is important, however, for the product of the glass bead-making process used in such applications to contain as high a proportion as possible of spherical beads which are not fused together. Beads formed in the known bead-making processes generally have sizes in the range of 50 microns, or sometimes less, up to 1,000 microns or more. Generally, however, it is preferred for the beads to have sizes at the mid to upper end of the 50 to 1000 micron size range.

The British Standards Institution specification for solid glass beads for use with road marking compounds and for other industrial uses, BS6088: 1981, defines three classes of beads depending upon their ultimate intended use. Class A beads are for incorporation in thermoplastic road marking compounds, class B beads are for surface application for thermoplastic road marking compounds and pavement marking paints, whilst class C beads are for impacting, plastics reinforcement and general industrial applications. The specification for a class A bead product requires at least 70% w/w of the beads to be spherical (as measured by a roundemeter) and the product to have a size distribution such that 0 to 10% w/w of the beads have a diameter below 425 microns, 65 to 95% w/w have a diameter in the range of from 425 to 850 microns, 5 to 70% w/w have a diameter in the range of from 850 to 1180 microns, and 0 to 3% have a diameter of greater than 1180 microns. The specification for a class B bead product requires at least 80% w/w of the beads to be spherical (as measured with the aid of a microscope) and the product to have a size distribution such that 0 to 15% w/w of the beads have a diameter below 180 microns, 10 to 30% w/w have a diameter in the range of from 180 to 300 microns, 30 to 75% w/w have a diameter in the range of from 300 to 600 microns, 5 to 20% w/w have a diameter in the range of from 600 to 850 microns, and 0 to 5% w/w have a diameter greater than 850 microns.

The reflective properties of class A beads are far superior to those of class B beads and, for this reason, it is preferred to incorporate class A beads in thermoplastic road marking material. However, the energy required to produce a glass bead increases markedly as the diameter of the bead increases. Accordingly, processes for preparing class A beads are more energy intensive and, hence, less energy efficient than processes for preparing class B beads.

In known processes for making glass beads, particles of crushed glass are raised to a high enough temperature such that the surface of the particles becomes molten, remaining in that transition state for sufficient time to allow surface tension effects to cause the particles to spherulise. The beads are then cooled to a lower temperature, at which they harden and at which they will not fuse with each other or to any other surfaces of the apparatus with which they come into contact.

Known apparatus for carrying out processes of this type comprises a furnace into which the particles of crushed glass are directed so as to pass horizontally through the flame of the burner in the furnace. In most apparatus the particles are introduced at the lower end of the furnace and are carried upwards to a quenching zone at the top of the furnace from which they are collected. In these types of furnaces there is a vertical temperature gradient between the heat treatment zone at the base and the quenching zone at the top. Generally, the energy consumption of these apparatuses is very high, typically of the order of 30 MJ/kg of beads or even greater. The high energy consumption of these apparatuses in turn leads to high operating costs.

To overcome the problems with the furnaces having a vertical temperature gradient a process utilising a vortex furnace has been described in the specification of European Patent No. 0,046,376 (EP-B-0,046,376). In the apparatus described in that specification the flame from a conventional gas burner in the furnace is caused to swirl in the manner of a vortex. The swirling is achieved partly by giving the particles of glass introduced in the centre of the burner a tangential component of velocity as they are injected into the flame, and partly by the introduction of secondary air tangentially around the furnace walls. The secondary air provides a quenching zone around the outside of the chamber, between the central flame and the walls. The glass particles are introduced into the furnace such that they follow a spiralling path from the centre of the flame and thence into the quenching zone from which the product is collected, either by passing through an aperture in the furnace wall or by falling to the bottom of the furnace.

It is stated in the specification of EP-B-0,046,376 that the inefficiency of the prior art processes discussed above lies in the long residence time of each glass particle in the furnace. Improved efficiency is alleged to result by reducing this residence time.

An improvement of the process and apparatus described in EP-B-0,046,376 is disclosed in U.S. Pat. No. 4,475,936. The apparatus of U.S. Pat. No. 4,475,936 as in the apparatus of EP-B-0,046,376 provides for a short residence time of the beads in the flame, and includes means for introducing tertiary air from nozzles arranged in a ring immediately surrounding the burner. The nozzles are angled to the burner axis in order to give the tertiary air a tangential component of velocity which increases the swirling of the flame of the burner.

It has been found that, although the processes described in EP-B-0,046,376 and U.S. Pat. No. 4,475,936 do have much improved efficiencies than the previously known processes discussed above, it is not possible using the process of either of these references to produce glass beads having a class A specification as given above. Most surprisingly, and contrary to the teaching of both EP-B-0,046,376 and U.S. Pat. No. 4,475,936, it has been found that a longer residence time of the glass particles in the flame of the vortex furnace is necessary to yield beads having a class A specification whilst still retaining a much improved efficiency over the previously known processes.

Accordingly, the present invention provides a method of heat processing particulate material comprising the steps of:

a: introducing a first current of a combustible gas and an oxidative gas into a substantially cylindrical chamber;

b: igniting the gas to form a flame which creates a heat processing zone;

c: introducing a second current of a gas into the chamber adjacent the chamber side wall, the second current having a component of velocity generally tangential of the chamber side wall, to provide a quenching zone in which the second current swirls around the flame; and d: contacting the particulate material with the heat processing zone and directing the material from the heat processing zone into the quenching zone from where it is collected, characterised in that the combustion gases of the flame have a speed of less than 10 m/s.

Although the process may be used for heat treating particulate materials other than glass, it is preferably used for producing glass beads.

All references to the speed of the combustion gases in this specification are references to the maximum speed attained by the combustion gases in the flame. In general, the combustion gases attain their maximum speed in the region at the base of the flame, that is in the region of the flame adjacent the region of introduction of the combustible gas and oxidative gas into the chamber.

The speed of the combustion gases in the flame is less than 10 m/s in the process of the present invention. The speed is generally as low as possible, the minimum speed being such as to avoid blowback of the flame, that is propogation of the flame backwards against the flow of the combustible gases being introduced.

The precise minimum speed of the combustion gases obtainable before blowback occurs depends upon the composition of the combustible gas and the particular design of the means introducing the gas into the chamber. For example, in the case of the combustible gas being propane and the oxidative gas being air the minimum speed is typically about 0.2 m/s, whilst in the case of a propane/air mixture enriched with oxygen the minimum speed may increase to about 0.3 m/s and even greater. The minimum speed attainable for a given gas composition may be readily determined by the person skilled in the art using routine experimentation and calculation. In general it is preferred that the speed of the combustion gases is greater than 1 m/s. In a preferred process, the speed of the combustion gases is less than 5 m/s.

The temperature of the heat processing zone necessary in order to form glass beads is dependant upon the diameter of the glass beads to be formed, the feed rate of the particles of crushed glass into the chamber and the residence time of the particles within the heat processing zone. In general, the heat processing zone should preferably have a temperature of greater than about 1000° C. More preferably, the heat processing zone has a temperature of greater than about 1500° C. Most preferably, the heat processing zone has a temperature in excess of about 2000° C., typically about 2500° C.

The higher the temperature in the heat processing zone the shorter the residence time required for spherulisation of the particles of crushed glass into beads. The residence time in the heat processing zone should in general be at least 0.1 s, preferably at least 0.2 s. It is often advantageous for the residence time to be at least 0.5 s, or even 1 s or more, especially at temperatures at the lower end of the preferred range or when producing beads of larger diameter It is preferred for the flame to comprise a central region which does not swirl. The outer regions of the flame may optionally be made to swirl by the current of the second gas introduced into the chamber to form the quenching zone. The external parts of the flame, which may optionally be swirling, usually have temperatures lower than that of the central part of the flame. The temperatures of these outer portions may be lower than 1000° C. and thus may not form part of the heat processing zone.

The current of second gas introduced into the chamber forms the quenching zone and performs the functions of containing the flame and cooling the wall of the chamber. In general, the volume of the current of second gas introduced into the chamber should be as low as possible whilst still sufficient to perform the aforementioned functions. The temperature of the current of second gas is preferably as high as possible to reduce heat losses from the flame, whilst being sufficiently low to cause the beads to harden when passing through the quenching zone. The temperature of the wall of the chamber must be sufficiently low to prevent adhesion of the particulate material to the inner surface of the wall. Generally, in the production of glass beads, it is preferred that the temperature of the wall is maintained below about 550° C. The walls of the chamber may be cooled by external cooling means to assist the cooling action of the current of second gas.

The current of second gas may comprise any inert gas or mixture of gases. Alternatively, it may comprise an oxidative gas or mixture of gases. It is preferably air.

It may be possible to premix the combustible gas and oxidative gas with the particulate material, for example by mixing the combustible gas with oxidative gas in which the particulate material is entrained. This operation may be achieved, for example, in the manner described in GB-2,121,782 or in U.S. Pat. No. 3,190,739. It is, however, generally preferred for the combustible gas to be mixed with the oxidative gas and then ignited and to introduce the particulate material into the flame after ignition. The particulate material is preferably carried by a gas or gas mixture of oxidative character which provides a portion of the oxidative gas required for combustion of the combustible gas. The particulate material and/or its carrier gas may be preheated before introduction into the chamber.

The combustible gas may be, for example, propane, but could be other low molecular weight hydrocarbons, for example methane or natural gas. Alternatively, the combustible gas may comprise a mixture of gases. The oxidative gas preferably contains oxygen. The oxidative gas may comprise a mixture of gases. It is preferably air which may be enriched with oxygen. In general, there are provided at least stoichiometric amounts of oxidative gas and combustible gas. However, greater than stoichiometric amounts of the oxidative gas may be used.

In a preferred process of the present invention the combustible gas and oxidative gas are directed upwardly into the substantially cylindrical chamber in an axial direction from a burner located in the central region of the bottom of the chamber and the particulate material, entrained in a carrier gas, is directed from injection means spaced radially from the burner, the particles being directed at an angle to the axis of the chamber such that they pass through the heat processing zone. From the heat processing zone the particles pass into the quenching zone. In this embodiment it is preferred to introduce and ignite further combustible gas and oxidative gas into the chamber directed in an axial direction but from a position spaced radially outwardly beyond the position of introduction of the particulate material. The temperature of the flame from this portion of the combustible gas is generally lower than the temperature of the heat processing zone and may, therefore, not be sufficiently high to achieve melting of the glass particles. It is thus important that substantially all of the particles pass through the hot central portion of the flame forming the heat processing zone before passing through the cooler outer portion of the flame.

According to a further aspect of the present invention a method of heat processing particulate material comprises the steps of:

a: introducing a first current of a combustible gas and an oxidative gas into a substantially cylindrical chamber;

b: igniting the gas to form a flame which creates a heat processing zone;

c: introducing a second current of a gas into the chamber adjacent the chamber side wall, the second current having a component of velocity generally tangential of the chamber side wall to provide a quenching zone, in which the second current swirls around the flame; and d: contacting the particulate material with the heat processing zone and directing the material from the heat processing zone into the quenching zone from where it is collected, characterised in that a preformed mixture of combustible gas and oxidative gas is directed upwardly into the substantially cylindrical chamber in an axial direction from a burner located in the central region of the bottom of the chamber; the particulate material, entrained in a carrier gas, is directed from injection means spaced radially from the burner whereby the particles are directed at an angle to the axis of the chamber such that they pass through the heat processing zone; and further combustible gas and oxidative gas is directed upwardly into the chamber in an axial direction from positions spaced radially outwardly beyond the position of introduction of the particulate material.

Usually in this aspect of the invention the combustion gases in the flame have a speed of less than 10 m/s, although the process may also be useful for conventional flames.

In order for satisfactory combustion of the combustible gas it is necessary for the gas to be mixed with the oxidative gas well before ignition. Generally, satisfactory mixing of the gases may be effected in means well known in the art, for example a conventional venturi system. In addition, however, it is preferred that the gases are contacted with a divided solid having a large surface area, for example a ceramic packing, to promote mixing. The gases are advantageously contacted with the divided solid in a mixing chamber immediately prior to their introduction, via a perforated plate or flame arrestor, into the cylindrical chamber and ignition. This has the effect of ensuring that the gases are evenly distributed across the flame arrestor, in turn leading to an even combustion of the gases within the cylindrical chamber. The desired speed of the combustion gases in the flame is determined by the area of the flame arrestor and the diameter of perforations in the flame arrestor.

According to a further aspect of the present invention there is provided apparatus for the heat processing of particulate material comprising:

a substantially cylindrical chamber with its axis arranged vertically;

first introduction means for introducing a first current of a combustible gas and an oxidative gas into the chamber adjacent its base and near to its centre and directing the gas upwards in the chamber;

means for igniting the combustible gas in the chamber to form a flame;

an outlet for exhaust gases from the top of the chamber;

means for introducing a second current of a gas tangentially into the chamber adjacent the chamber side wall to provide a quenching zone in which the second current swirls around the flame;

means for introducing particulate material upwardly into the chamber such that it passes through the flame and into the quenching zone;

means for collecting processed particulate material from the quenching zone; characterised in that the means for introducing and directing the combustible gas and the oxidative gas into the chamber are such that the combustion gases in the flame have a speed of less than 10 m/s.

The means for collecting processed particulate material may be provided in the side wall of the chamber or at the bottom of the chamber. Preferably, the means for collecting processed particulate material are provided in the bottom of the chamber and may comprise, for example, one or more slots through which the processed material may fall or one or more hoppers formed in the bottom of the chamber. Particulate material of small diameter may be carried upwards within the chamber and be entrained in the exhaust gases. In such cases, further collecting means may be provided, for example one or more cyclones, to recover processed material from the exhaust gases.

The apparatus comprises means for mixing the combustible gas and oxidative gas prior to ignition. This may be effected by means well known in the art, for example a venturi. In addition, however, it is preferred that a mixing chamber is provided comprising a divided solid having a high surface area, for example a ceramic packing, with which the gases are contacted to promote mixing.

The means for introducing the combustible gas and oxidative gas into the chamber comprises a burner assembly. Advantageously, the burner assembly comprises the aforementioned mixing chamber from which the mixed gases exit through a perforated plate or flame arrestor directly into the cylindrical chamber; the divided solid ensuring an even distribution of gases across the burner and, hence, an even combustion within the cylindrical chamber. Other burners which may be adapted for use in the invention are described in the specification of British Patent No. 1,513,531 (GB 1,513,531) and the specification of German patent application No. 234061 (DD-A-234061).

Although it may be possible to provide means for mixing the particulate material with the combustible gas and oxidative gas prior to being introduced into the chamber, for instance as described in the specification of British patent application publication No. 2,121,782 (GB-A-2,121,782) and U.S. Pat. No. 3,190,737, it is preferred that there are means for introducing particulate material into the chamber separately from the combustible gas.

The particulate material is generally introduced entrained in a carrier gas, which may provide some of the oxidative gas for combustion of the combustible gas. The particulate material may be fed into a stream of the carrier gas from various sources. For example, the particulate material may be introduced from a fluid bed, as described in U.S. Pat. No. 4,475,936. Alternatively the particulate material may be fed from a vibro feeder fed from a hopper, via a rotary valve and into a venturi box where the particles are entrained in a compressed air stream, as described in EP-A-0,046,376. Alternatively the particulate material may be fed from a hopper via a screw feeder into an entrainment chamber where it is entrained in compressed air, in a manner similar to that described in U.S. Pat. No. 3,190,737.

The means for injecting the particulate material entrained in carrier gas generally comprises one or more injection nozzles in the base of the chamber. The nozzles may, for example be arranged around a central burner assembly, thus radially spaced from the axis of the chamber. The nozzles direct the particulate material into the heat processing zone, by being directed upwards and inwards towards the axis. Typically there are at least four such nozzles, preferably at least six nozzles, and most preferably twelve nozzles arranged regularly around the axis of the chamber.

The apparatus may also comprise preheating means for preheating one or more of the particulate material, its carrier gas and the second current of gas. Such preheating means preferably include a heat exchanger which transfers heat from the exhaust gases.

In a further preferred embodiment of the apparatus the means for introducing combustible gas and oxidative gas is located at the bottom of the chamber substantially centrally in the chamber and additional introduction means for introducing further combustible gas is provided radially spaced from the central gas introduction means. The second means are generally spaced outwardly from the injection means for particulate material, preferably in the form of a ring spaced radially outwardly from the particulate material injection means.

According to a further aspect of the invention apparatus suitable for carrying out the new process comprises:

a substantially cylindrical chamber with its axis arranged vertically;

first introduction means for introducing a first current of a combustible gas and an oxidative gas into the chamber adjacent its base and near to its centre and directing the gas upwards in the chamber;

means for igniting the combustible gas in the chamber to form a flame;

an outlet for exhaust gases from the top of the chamber;

means for introducing a second current of gas tangentially into the chamber adjacent the chamber side wall to provide a quenching zone in which the second current swirls around the flame;

means for introducing particulate material upwardly into the chamber such that it passes through the flame and into the quenching zone;

means for collecting processed particulate material from the quenching zone;

characterised in that the means for introducing the combustible gas and the oxidative gas is located at the bottom of the chamber substantially centrally in the chamber, the means for injecting particulate material into the chamber comprises injection nozzles spaced outwardly from the means for introducing the combustible gas and directed inwards towards the chamber axis, the apparatus further comprising second introduction means for introducing further combustible gas radially spaced from the first introduction means.

In the apparatus of this aspect of the invention it is preferred that the first introduction means for introducing the combustible gas and oxidative gas are such that the combustion gases in the flame have a speed of less than 10 m/s. However, the apparatus has wider applications and may be used in a process in which the combustion gases in the flame attain greater speeds The speed of the combustion gases in the flame may be readily determined by methods which are themselves known in the art. Examples of such methods include utilising the phenomenon of the Doppler effect using light from a laser and the introduction of particles into the flame which may be traced using a camera. However, a method found to be particularly suitable for application to the apparatus of the present invention is as follows:

A titanium rod is passed through an aperture in the centre of a titanium disc, of known mass and diameter, to form a probe, the disc being freely movable along the rod. The probe is placed in the path of the combustion gases in the flame with the axis of the rod being substantially parallel to the axis of the chamber. Once placed in the flame, the disc will either rise under the force of the moving combustion gases impinging on the surface of the disc, remain stationary in the flame or fall under the effect of gravity. The aforementioned steps are repeated using a selection of discs of equal diameter and varying masses until a disc is found that remains stationary upon insertion of the probe into the flame. The speed of the combustion gases in the region of the flame in which the disc remains stationary may be calculated using the following equation:

$$u = \frac{2mg}{C_d \rho A}$$

in which u is the speed of the combustion gases, m is the mass of the disc, g is the acceleration due to gravity, $C_d$ is the coefficient of drag for the disc, $\rho$ is the density of the combustion gases and A is the projected surface area of the disc impinged by the combustion gases.

An embodiment of the apparatus of the present invention will now be described in detail, by way of example only, with reference to the accompanying drawings, in which.

Figure 1:
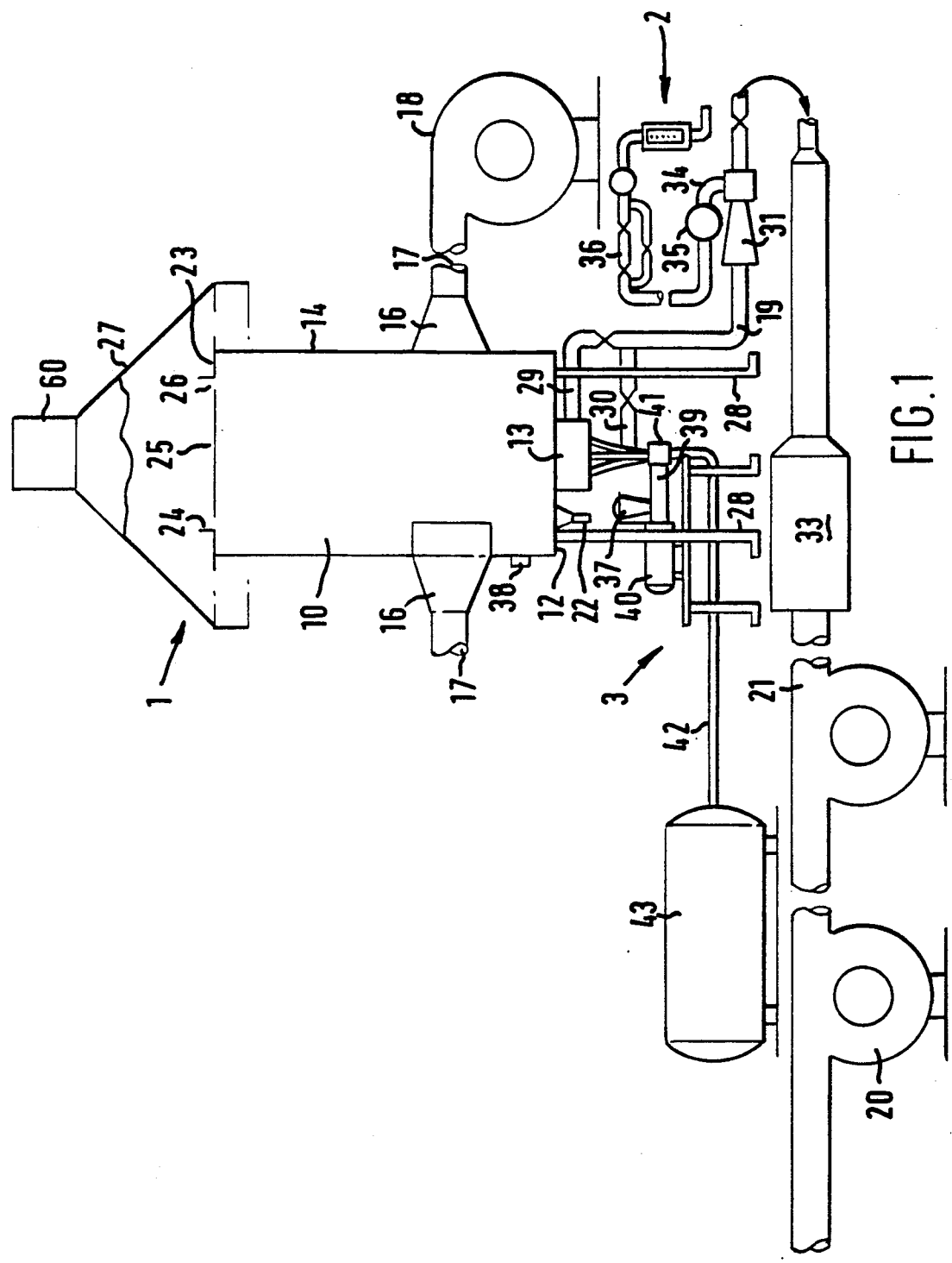
FIG. 1 is a schematic side elevation of the apparatus.

The drawings show a vortex furnace apparatus specifically for the production of glass beads. The major components of the apparatus are a furnace 1, a burner assembly and gas supply generally indicated by 2, and a material feed apparatus generally indicated by 3.

The furnace 1 comprises a substantially cylindrical chamber 10, a lower end wall 12 of which includes a central hole in which a burner assembly 13 is located. The peripheral wall 14 of the chamber has attached thereto two tangentially disposed air inlets 16 arranged in a diamatrically opposed pair. The inlets 16 taper back to pipes 17 which are connected via a manifold (not shown) to a source 18 of air (secondary air). The source 18 may be a fan of known type With suitable controls for the rate of flow of air to the inlets 16. Four outlet ports, one of which is indicated as 22, for glass beads are provided in the lower end wall 12 at the periphery thereof. Further outlet ports could be provided in the side walls 14 around the periphery of the chamber.

An upper end wall 23 of the chamber includes a centrally disposed flue 24. A top-plate 25 is located in the flue 24 to provide an annular outlet 26 for gases from the chamber. A canopy 27 is positioned above the flue. The canopy 27 has an exhaust gas outlet 60 leading to an extractor fan (not shown) for providing an induced draft in the chamber 10 for removal of the exhaust gases. The chamber 10 is mounted on legs 28. The chamber 10 may be fabricated from mild steel. Preferably the chamber 10 is fabricated from chromium plated stainless steel, The outer surface of the peripheral wall 14 of the chamber 10 may be lined with a refractory. A cooling jacket may be provided to keep the temperature of the peripheral wall 14 of the chamber 10 low to prevent adhesion of the glass beads to the inner surface of the chamber.

Figure 2:
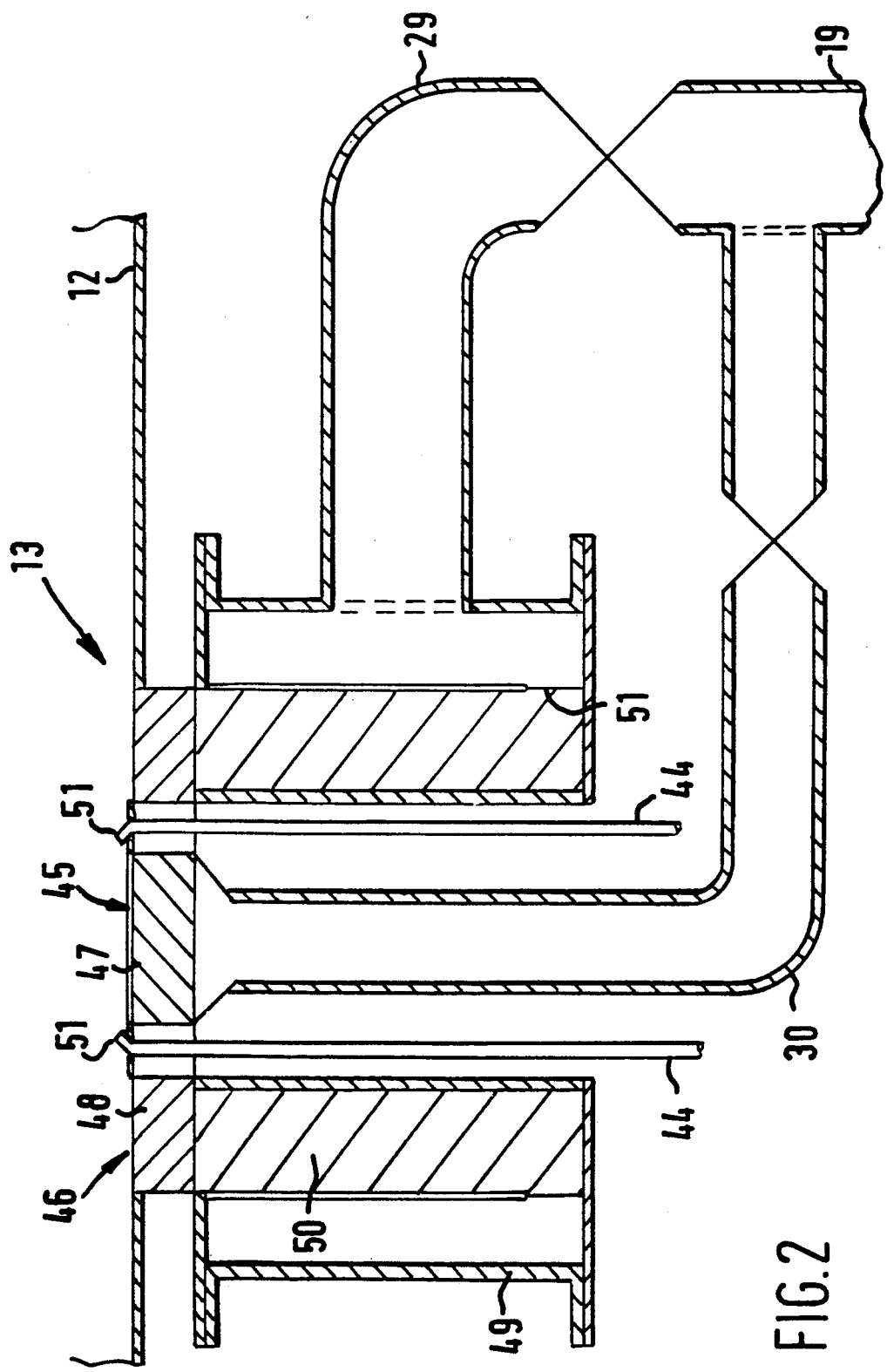
FIG. 2 is an enlarged section through a burner assembly of the apparatus of FIG. 1.

The burner assembly 13, which is shown in greater detail in FIG. 2, has inlets 29 and 30 for a gas/air mixture to be combusted. The gas and air are mixed in a mixing venturi 31 to which air (primary air) is supplied by a booster fan 20 and a fan 21 through a preheating chamber 33. The combustion gas, typically natural gas, is supplied to the venturi 31 through a line 34 including flow control and metering valves and devices 35 of known type. The line 34 also includes a cut-off valve 36 which automatically operates to close and cut-off the gas supply in the event of failure of certain parts of the system. This prevents accumulation of unburnt gas in the chamber. The valve 36 closes in the event of failure of primary air supply or flame failure (which is detected by an ultra violet sensitive photocell 38 in the peripheral wall of the chamber).

Figure 3:
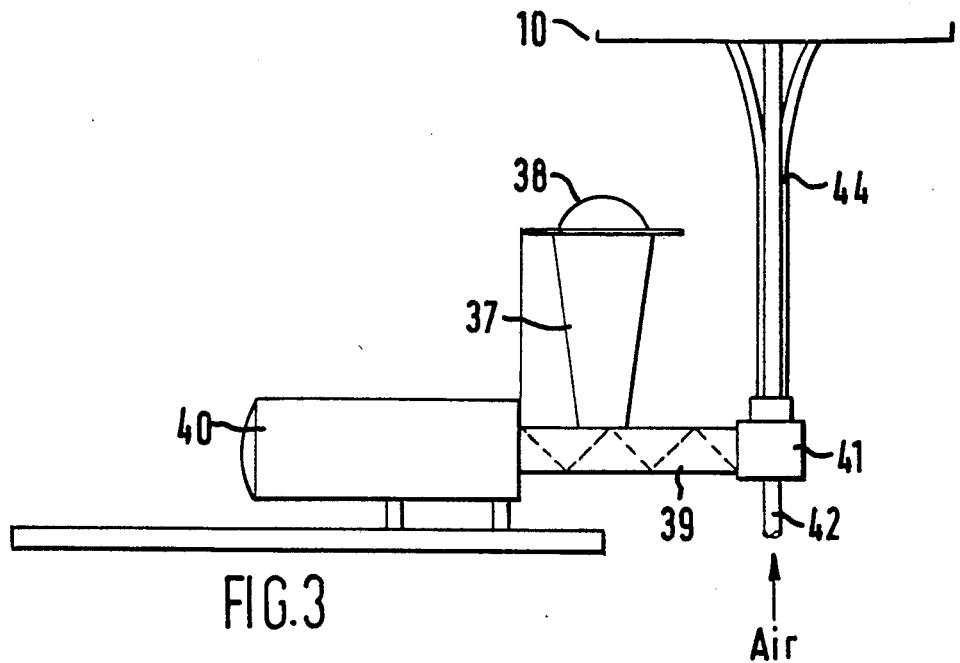
FIG. 3 is a schematic side elevation view of one material feed apparatus used in the apparatus of FIG. 1.

Particles of crushed glass, or other material to be processed in the furnace are supplied from the material feed apparatus 3, which is shown in greater detail in FIG. 3. Apparatus 3 comprises a bulk hopper 37 for containing crushed glass 38 which is continuously supplied to a screw feeder 39 driven by a motor 40. Glass to be processed is first crushed and then sieved into size bands before loading into the hopper 37. For a given apparatus and operating conditions, the size band of the material placed in the hopper 37 determines the maximum possible feed rate of the material into the chamber, the rate decreasing with material of increasing size band. The screw feeder discharges the cullet into a chamber 41 where it is entrained in a stream of compressed air from line 42 which leads from a compressor 43. The entrained particles of glass are directed from the chamber 41 into each of three lines 44 which are directed into the burner assembly 13 and thence into the chamber 10.

Referring now to FIG. 2 the burner assembly 13 is fitted into the centre of the bottom wall 12 of the furnace chamber. The burner itself comprises a generally circular inner burner portion 45 and an outer burner portion 46 which is generally ring shaped. The inner burner part is fed with a natural gas/air mixture through line 30 and the outer burner part is fed with that mixture through line 29. Lines 29 and 30 are supplied from a common supply line 19 from the venturi 31 (in FIG. 1). Each burner portion 45,46 is provided with a flame arrester 47, 48. The line 29 comprises an annular chamber 49 which contains an annular mixing region 50 packed with a divided ceramic packing having an extended surface area and which is confined by mesh divider 51. A natural gas/air mixture passing through line 29 must pass through the mixing region 50 before being introduced into the chambers through the flame arrester 48. There are ignition means (not shown) in the chamber for igniting the combustible gas from each part of the burner.

Particles of crushed glass entrained in air are fed to the burner assembly 13 through lines 44. The apparatus comprises six of these lines which are fed by two material feed apparatus, each supplying three of the feed lines 44. (FIG. 1 shows one of the two mechanisms). At the end of each line 44 is a nozzle 51 through which the particles are injected into the chamber 10. The nozzle is angled to the axis of the chamber such that the particles move upwards and inwards towards the axis of the chamber into the heat processing zone where the temperature of the flame from the burner is sufficiently hot for spherulisation of the particles to take place.

Figure 4:
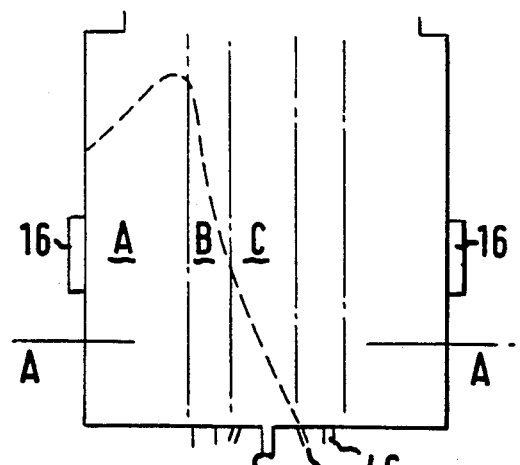
FIG. 4 is a schematic side elevation of the furnace chamber of the apparatus of FIG. 1 showing the flight path of a particle within the chamber.
Figure 5:
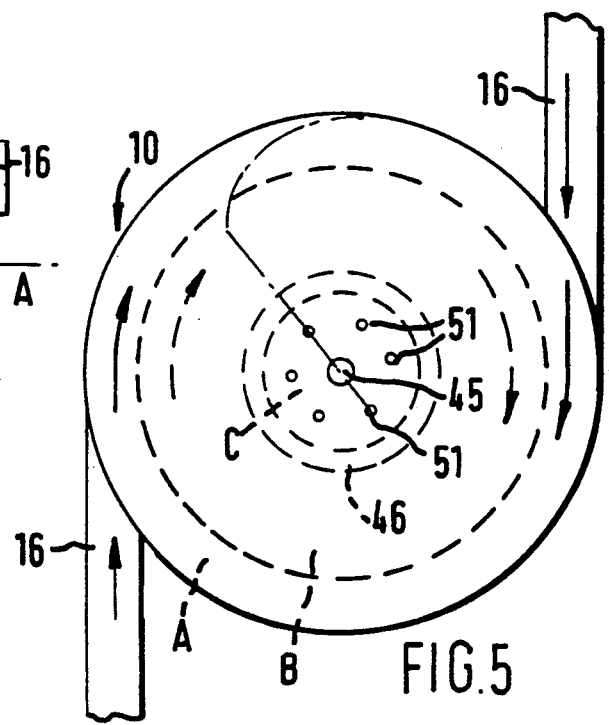
FIG. 5 is a schematic plan view corresponding to FIG. 4.
Figure 6:
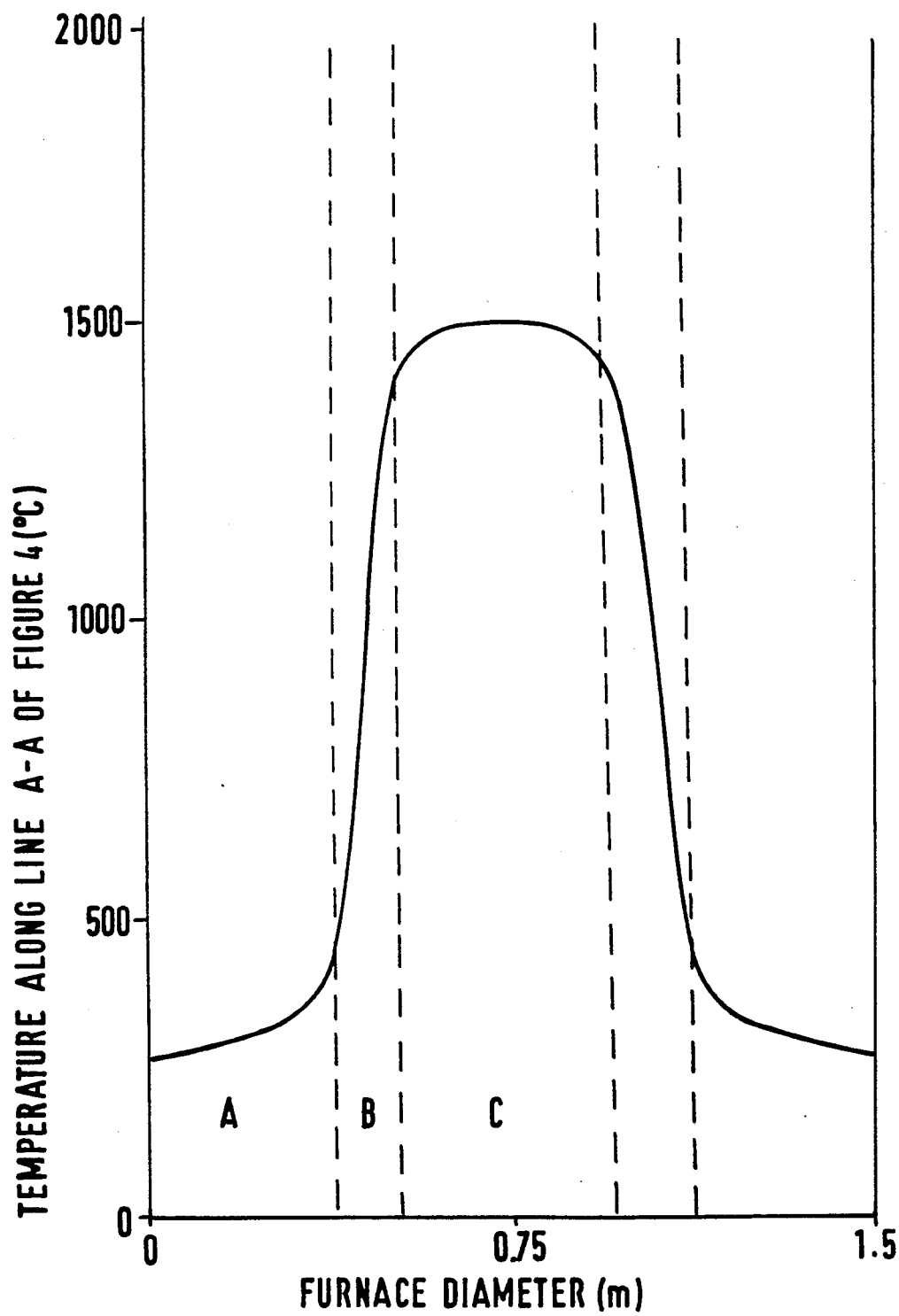
FIG. 6 is a diagram showing the temperature profile in the furnace chamber along the line A—A of FIG. 4.

The path travelled by a particle of material injected through a nozzle in the process is shown in FIGS. 4 and 5, whilst the temperature profile across the chamber under typical process conditions is shown in FIG. 6. In FIG. 4 it can be seen that a particle is directed upwards through the hot part of the flame generally identified as C forming the heat processing zone, and then into the cooler part of the flame B and from there into the quenching zone A which is provided with swirling secondary air through inlets 16. The swirling air in quenching zone A may make the flame in zone B swirl at its outer extremity, as indicated by the arrows in FIG. 5, but the flame in the central, hottest part of the flame C is not caused to swirl. As a particle moves upwardly and radially away from the centre into the outer regions of zone B it is directed in a helical path through the quenching zone A, as shown most clearly in FIG. 5. Heavier beads may follow a lower trajectory than that shown in FIG. 4. Light beads may be entrained by the combustion gases and secondary air and leave the chamber 10 through the part 26. Such beads are collected from the exhaust gases by means of a cyclone (not shown).

The process and apparatus of the present invention will be further illustrated by the following Examples, in which Examples 1 to 6 relate to a process and apparatus according to the present invention whilst Examples 7 to 10 are comparative examples relating to a prior art process and apparatus.

EXAMPLE 1

Particles of crushed glass having a sieved size band of 425 to 600 μm were fed at a rate of 3 kg/minute to apparatus as represented in FIG. 1 having a chamber of weight 330 kg and diameter 1.5 m. The apparatus comprised a burner operated at a rating of 3165 MJ (30 therms) to provide a flame having a diameter of 0.7 m in which the speed of the combustion gases was less than 10 m/s. Secondary air was fed to the chamber to provide a quenching zone at a volumetric flowrate of 1.51 m$^3$/s at a pressure of 1 bar. The particles of glass were entrained in air at a feed air pressure of 1.6 bar. The glass bead product was collected through the base of the chamber and comprised 83.1% of spherical glass beads determined using a roundometer.

EXAMPLES 2 TO 6

Using the apparatus described in Example 1 above further quantities of glass beads were produced using particles of crushed glass in the sieved size band of 425 to 600 μm. The results are set out in Table 1, indicating, were necessary, the varied process conditions.

TABLE 1

| Ex. No. | Glass feed rate (kg/min) | Burner Rating (MJ/h) | Secondary air Volumetric Flowrate (m³/s) | feed air pressure (bar) | Spheres in product (%) |
| --- | --- | --- | --- | --- | --- |
| 1 | 3 | 3165 | 1.51 | 1.6 | 83.1 |
| 2 | 3 | 3165 | 0.925 | 1.4 | 82.5 |
| 3 | 3 | 3165 | 0.925 | 1.4 | 81.5 |
| 4 | 3 | 3165 | 0.925 | 1.4 | 83.1 |
| 5 | 3 | 3165 | 0.925 | 1.4 | 80.3 |
| 6 | 3 | 3165 | 0.925 | 1.4 | 80.4 |

EXAMPLE 7 TO 10

Particles of crushed glass having a sieved size band of 425 to 600 μm were fed at a rate of 4 kg/minute to the apparatus described and exemplified in the specification of EP-A-0,046,376, in which the combustion gases of the flame achieved speeds in excess of 25 m/s. The results of four runs using this apparatus are set out in Table 2.

TABLE 2

| Ex. No. | Glass feed rate (kg/min) | Burner Rating (MJ/h) | Secondary air Volumetric Flurate (m³/s) | Spheres in product (%) |
| --- | --- | --- | --- | --- |
| 7 | 4 | 3165 | 0.74 | 45.4 |
| 8 | 4 | 3165 | 1.3 | 55.4 |
| 9 | 4 | 3165 | 1.4 | 44.8 |
| 10 | 4 | 3165 | 1.4 | 41.2 |

By comparing the results of Examples 1 to 6 with those of Examples 7 to 10, it can be seen that, unlike the process and apparatus of EP-A-0,046,376, the process and apparatus of the present invention consistently produces a glass bead product which contains in excess of 80% spherical beads in the 425 to 600 μm size band. Such a product exceeds the minimum requirement of 65% spherical beads in the 425 to 850 μm size band for class A beads set by British Standard BS 6088: 1981 discussed above. The product achieved in Examples 1 to 6 is ideally suited to blending with a quantity of beads having a size band of 850 to 1180 μm to yield a total glass bead product meeting BS 6088: 1981 Class A specifications.

I claim:

1. The method of heat processing particles of glass comprising the steps of:
    introducing a first current of a mixture of a combustible gas and a gas capable of oxidizing the combustible gas, into a substantially cylindrical chamber arranged with its axis substantially vertical, the first current being introduced at a lower end of the chamber and being directed upwardly into the chamber in an axial direction from a burner located in the central region of the lower end of the chamber;
    introducing a second current of a mixture of a combustible gas and a gas capable of oxidizing the combustible gas of the second current, into the chamber at the lower end thereof in an axial direction from a position spaced radially outwards from the position of introduction of the first current;
    igniting the combustible gas from said first and second currents to form a flame wherein the combustion gases have a speed of less than 10 m/s, said flame creating a heat processing zone within the chamber;
    introducing a third current of a gas into the chamber adjacent the chamber side wall, said third current having a component of velocity generally tangential to the chamber side wall at its point of introduction, to provide a quenching zone, in which said third current swirls around the flame; and
    introducing particles of glass entrained in a carrier gas into the chamber at the lower end thereof, the particles being directed from injection means spaced radially outwards from said burner located at said lower end of the chamber, and inwards from the point of introduction of said second current, whereby the particles are directed at an angle to the axis of the chamber such that they pass through the heat processing zone and into the quenching zone where they harden and from where they are collected.

2. The method according to claim 1, in which the particles of glass are spherulised as they pass through the heat processing zone to form beads.

3. The method according to claim 1, in which the heat processing zone of the flame has a temperature of greater than 2000° C.

4. The method according to claim 1, in which the mixture of the combustible gas and the gas capable of oxidizing the combustible gas is formed by mixing the combustible gas, in a chamber containing a divided solid having a high surface area, with the gas capable of oxidizing the combustible gas.

5. The method according to claim 1, in which the speed of the combustion gases is less than about 5 m/s.

6. A method of heat processing particles of glass comprising the steps of:
    introducing a first current of a mixture of a combustible gas and a gas capable of oxidizing the combustible gas, into a substantially cylindrical chamber arranged with its axis substantially vertical, the mixture being introduced at a lower end of the chamber;
    igniting the combustible gas to form a flame containing combustion gases in which the combustion gases have a speed of less than 10 m/s, said flame creating a heat processing zone within the chamber;
    introducing a second current of a gas into the chamber adjacent the chamber side wall, said second current having a component of velocity generally tangential to the chamber side wall at its point of introduction, to provide a quenching zone, in which said second current swirls around the flame;
    introducing particles of glass into the chamber at the lower end thereof; and
    passing the particles of glass through the heat processing zone of the flame and into the quenching zone where they harden and from where they are collected, in which the mixture of the combustible gas is directed upwardly into the chamber in an axial direction from a burner located in the central region of the lower end of the chamber, and the particles of glass are entrained in a carrier gas and the particles of glass entrained in the carrier gas are directed from injection means spaced radially outwards from the burner such that the particles are directed at an angle to the axis of the chamber such that they pass through the heat processing zone, and in which further combustible gas is introduced into the chamber at the lower end thereof in an axial direction from a position spaced radially outwards from the position of introduction of the particles of glass.

7. The method according to claim 6, in which the particles of glass are spherulised as they pass through the heat processing zone to form beads.

8. The method according to claim 6, in which the heat processing zone of the flame has a temperature of greater than 2000° C.

9. The method according to claim 6, in which the mixture of combustible gas and the gas capable of oxidizing the combustible gas is formed by mixing the combustible gas, in a chamber containing a divided solid having a high surface area, with the gas capable of oxidizing the combustible gas.

10. The method according to claim 6, in which the speed of the combustion gases is less than about 5 m/s.

* * * * *